Figure 1:
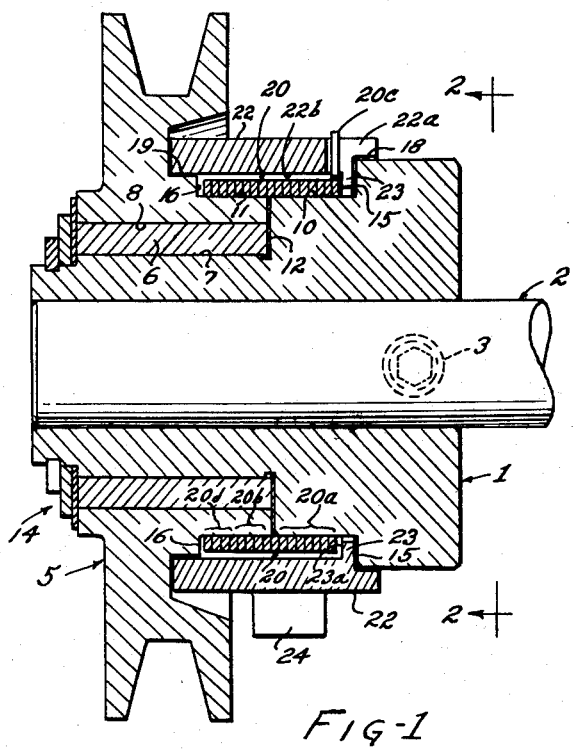

Jan. 17, 1961   C. R. SACCHINI ET AL   2,968,380
SPRING CLUTCH MECHANISMS
Filed Jan. 30, 1957

INVENTOR.
COLUMBUS R. SACCHINI
DONALD R. TOMKO
BY George M. Soule
ATTORNEY

United States Patent Office 2,968,380
Patented Jan. 17, 1961

REISSUED
AUG. 21, 1962
RE 25,229
2,968,380

SPRING CLUTCH MECHANISMS

Columbus R. Sacchini, Willoughby, and Donald R. Tomko, Cleveland, Ohio, assignors to Curtiss-Wright Corporation, New York, N.Y., a corporation of Delaware Filed Jan. 30, 1957, Ser. No. 637,239

3 Claims. (Cl. 192—81)

Spring or coil clutch mechanisms when arranged for intermittent drive of a rotary load from a continuously rotating shaft or the like commonly have coaxial input and output relatively rotatable circular drums and a helical coil friction spring is resiliently preloaded at least on the input drum and reactively connected to the output drum. Thereby the clutch spring is self energizing by friction normally to grip the two drums and drive the load, but the arrangement permits the input drum to overrun the spring in frictional contact therewith (in other words permits effectual disengagement of the clutch mechanism) when the coil of the spring which is farthest from the output drum along the rotational axis (input "free" end coil) is arrested. In such spring clutches a control sleeve or collar loosely enveloping the spring and rotatable therewith is commonly attached to the input-drum associated free end coil of the spring, and a control finger or plunger engages a release shoulder on the sleeve to disengage the clutch.

In case the clutch spring is resilient or elastically preloaded on the output drum as well as on the input drum, but is otherwise unattached to either drum, thus being, as commonly known in coil clutches, a full floating type clutch spring, then when the control sleeve or collar is arrested by the stop finger the output drum and mechanism connected therewith can overrun the clutch spring and come to a stop unrestrained by the clutch mechanism except for the overrunning friction of the spring coils on the output drum. If on the other hand the clutch spring is positively secured to the output drum and the load has considerable inertia and kinetic energy then, during the clutch disengaging operation, the spring either tends to be injured by excessive expansion of its coils or, if expansion is limited as by radial abutment of its coils with the control sleeve, then the disengaging operation is likely to be accompanied by undesirable shock to the mechanism. Thus usually the clutch spring is preloaded for necessary reactance and self energization on the output drum as well as on the input drum. Heretofore, we believe, such preloading of the clutch spring on both the input and output drum surfaces has been approximately uniform at least by intention or design.

When such uniform or nearly uniform preloading, as just above referred to, is practiced then during all operating times when the clutch is disengaged the input-drum-associated coils ride the continuously rotated input drum with appreciable force (generally proportional to the preloading), producing undesired temperature rise. More important, in practically all types of service, the input-drum-associated coils tend to vibrate or flutter, producing so-called fretting or vibration corrosion of the coacting coil and drum surfaces and premature wearing out of those surfaces.

We have discovered that by providing a materially greater preloading or interference fitting relationship between one or more coils of the full floating clutch spring and the output drum than any coils of the spring have in respect to the input drum then (assuming the kinetic energy of the load is sufficient as is almost always true) all the input-drum-associated coils are moved, e.g. expanded, entirely clear of the input drum and so remain as long as the output drum is prevented from being turned backward following the clutch disengaging operation and overrunning of the output drum relative to the spring. Average loads have sufficient built-in friction and inertia to prevent retrograde motion of the output drum after it comes to a stop; and in exceptional cases or whenever required many simple but effectual antirotational or noback devices are applicable to prevent retrograde rotary motion following forward motion.

We have found further that by the use of a relatively simple formula dervied from well recognized principles of helical spring or coil clutch construction and applicable to the materials and spring stock section shapes most effectually used therein, the necessary or desirable amount of diametral clearance between the input drum and its associated coils during clutch disengagement can be reliably predicted as a function of overrunning torque resulting from selection of (a) suitable numbers of coils relatively heavily elastically preloaded on the output drum and (b) the degree or amount of elastic preloading of those coils on such drum.

Figure 2:
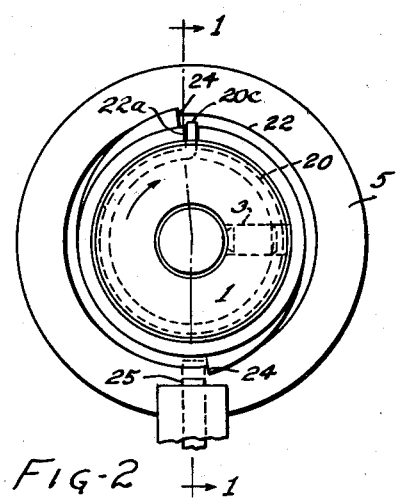
Figure 3:
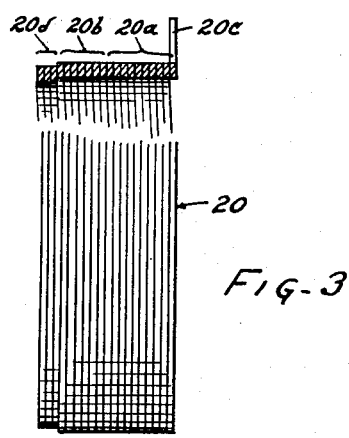

In the accompanying drawing Fig. 1 is a double scale central longitudinal sectional assembly view of an illustrative embodiment of the present clutch mechanism. Fig. 2 is a full scale end elevation of the mechanism viewed as indicated on Fig. 1 by the line 2—2. Fig. 3 is fragmentary double scale sectional and elevational view of a preferred form of clutch spring.

In Fig. 1, the input clutch drum member 1 is shown in the form of an adapter for a power shaft 2 assumed to have suitable bearing supports not shown. The drum member 1 is suitably secured as by a screw 3 to turn continuously with the power shaft. The output drum member 5 is shown in the form of a pulley supported for rotation relative to the shaft 2 and drum member 1 as by a suitable bearing bushing 6 between a reduced diameter surface portion 7 of the input drum member and an internal circular surface 8 of the pulley hub (e.g. bushing press fitted in the pulley hub). The circular clutch drum surfaces 10 and 11 are preferably cylinders of equal diameter formed on the drum members 1 and 5 respectively. The axially adjacent inner end surfaces of the members 1 and 5, as shown, are maintained in closely spaced apart relationship as by a washer 12 between the drum members in cooperation with a snap ring and washer assembly 14 carried by a tubular portion of the drum member 1, left, Fig. 1. Axial shoulders 15 and 16 on the drum members 1 and 5 adjacent respective drum surfaces 10 and 11 provide an annular channel for the clutch spring 20. The channel, as shown, is partly occupied by a rib portion 23 of a clutch control sleeve 22, described later, the involved parts being dimensioned to insure adequate free working clearance for the clutch spring 20 axially of the spring.

Clutch spring 20, as shown particularly in Fig. 3 in a relaxed state, is of generally cylindrical form with input-drum-associated coils 20a and output-drum-a sociated coils 20b and 20d. The endmost free end coil 20a has an outwardly projecting release toe 20c formed thereon. For clutch disengagement purposes the control sleeve 22 is axially slotted at 22a to receive the toe 20c, and the sleeve 22 is supported for free rotation relative to both clutch drum members 1 and 5 as on circular surfaces 18 and 19 of the drum members adjacent to their shoulders 15 and 16 respectively. The control sleeve 22 has one or more clutch release shoulders or abutments 24, two being shown, projecting radially therefrom for engagement by a stop pin or plunger 25 as partially shown in Fig. 2. The clutch mechanism is shown in Fig. 1 with the clutch spring 20 of Fig. 3 in torque-transmitting or engaged condition or with all its coils contracted against the drum surfaces. The stop pin 25 is projected into the path of rotation of the shoulders or abutments 24 by any suitable means, not shown, in order to disengage the clutch mechanism by arresting rotation of the clutch spring.

Referring further to Fig. 3 the coils 20a of spring 20 are made with their normal inner diameters smaller than the external diameter of input drum surface 10 or so as to be in elastically or resiliently preloaded relation thereto sufficiently to insure their self energization on the input drum. Output-drum-associated coils 20b, as shown, have the same diameters as coils 20a. A preferably limited number of output-drum-associated free end coils 20d of the spring, for example three free end coils, are formed (e.g. as part of the same automatic coiling machine operation which forms coils 20a and 20b) in radially offset relationship to the other coils inwardly toward the coil axis so as to have materially greater elastic or resilient preloading on the output drum surface 11 than any of the other coils have on their coacting drum surfaces. An increase in the number of coils 20d relative to the number of coils 20b at any particular preloading of coils 20d will increase the overrunning torque. The number of coils 20d and the amount of radial offset of those coils (exaggerated in Fig. 3) are selected particularly in relation to the index of the spring (mean coil diameter divided by the radial dimension or height of the individual coils) so that, assuming the output drum member 5 has substantial mass or is connected to a body having substantial mass supported for relatively free rotation, the operation of arresting the rotation of the control sleeve to disengage the clutch mechanism will result in overrun of the output drum member 5 in frictional contact with the coils 20d, and the overrunning torque thereby applied to the clutch spring 20 will, in turn, result in expansion of its coils 20a completely clear of the input drum surface 10.

The coils 20a and 20b, incidentally, become approximately uniformly expanded by the overrunning action of drum surface 11 on the coils 20d so that the latter coils, by remaining in seated position on the drum surface 11, tend to hold all the expanded coils in uniformly spaced relationship to their associated drum surfaces 10 or 11.

The reason for limiting the number of coils 20d in relation to the number of coils in the clutch spring which are associated with the output drum surface 11 is so that, when providing a minimum (axial-space-conserving) total number of coils in the spring in order to carry the expected load, there will be a considerable number of the spring coils expanded during clutch disengagement as described above. Thereby if, after clutch disengagement, unusual conditions (e.g. low friction in the driven device or load) should permit back-travel or retrograde angular movement of the output drum following its overrun, a greater angular retrograde movement would be required in order to allow reseating of any of the spring coils on the input drum than would be required if nearly all of the coils (20b and 20d) around the output drum surface 11 were to have equal, relatively heavy, preloading on said surface. In other words the relatively lightly preloaded coils 20b, when expanded, augment the expanded coils 20a in safeguarding against possible back-travel as just discussed above.

The radial distance between the outer peripheral surfaces of the spring coils 20a and 20b and the inner peripheral surface 22b of the release sleeve 22, when the coils are gripping, is preferably somewhat greater than the distance the coils 20a and 20b are expanded when the output drum surface 11 frictionally overruns the relatively heavily preloaded coils 20d. Thereby clutch disengagement cannot possibly be accompanied by shock or noise. By design, however, the spring index and the rest can be chosen in reference to the torque required to cause the output drum surface 11 to overrun the clutch spring coils 20d and with reference to the radial clearance between the coils and the sleeve 22 when the coils 20a and 20b are in gripping position, so that torque of such magnitude will, during disengagement of the clutch, expand the input-drum-associated coils into light contact with the interior surface of the sleeve 22, thereby further insuring centering of all of the expanded coils with reference to their associated drum surfaces.

When a full floating type clutch spring, such as 20 hereof Fig. 1, is unconnected with its associated clutch drums except by elastic preloading thereon, then some means is required to limit axial movement of the spring out of position. Shoulders similar to 15 and 16 of drum members 1 and 5 hereof usually serve that purpose. We have found that if the free end of the clutch spring (e.g., the coil supporting the toe 20c) which is associated with the input drum is permitted at times to rub axially on a shoulder such as 15, which turns with the drum 1 during clutch disengagement, then fretting corrosion and wear frequently results, evidently because the rubbing contact produces vibration of the clutch spring or (possibly) spasmodic contraction of the coils 20a into contact with the input drum surface 10. Accordingly, as one convenient means for preventing contact between the spring and the input drum member 1 axially of the spring during clutch disengagement, the control sleeve 22, which is constrained to rotate only when the clutch spring rotates, is provided with an inwardly extending annular rib or rib portion 23 having a shoulder surface 23a axially adjacent the free end coil of the clutch spring 20. Whenever the clutch spring moves or tends to move toward the right (Fig. 1) out of its normal or free-working position, such movement is blocked by the rib 23 whose rightward movement, in turn, is blocked by the shoulder 15 of the input drum member 1. The rib 23, during clutch disengagement, is normally out of contact with the shoulder 15 and it is never in tight contact therewith.

In the herewith-illustrated full floating type spring clutch construction, as opposed to a construction in which the output end of the clutch spring is positively connected to the load, the maximum overrunning torque which operates to expand the coils 20a completely clear of the input drum surface 10 is automatically limited by the maximum static unit pressure the coils 20d can be caused to exert radially against the output drum surface 11 in being elastically preloaded thereon by interference fitting; and that unit pressure is, of course, limited by the yield point of the spring material. Experience has demonstrated that if all the coils of the clutch spring have uniform resiliency (as when all the coils have uniform physical properties, and are of approximately uniform cross section) it is then impossible (in the absence of auxiliary means) so to preload the coils 20d on the output drum as to produce, through overrun of the output drum, an expansion of the coils 20a (and/or 20b) such as could injure those coils although the mechanism has no means capable of limiting their expansion. Thus the internal surface 22b of the control sleeve 22 of the present construction can be at any desired radial distance from the external peripheral surfaces of the coils 22a and 22b when those coils are contracted against their associated clutch drums.

Since the overrunning torque necessary to cause expansion of the coils 20a out of contact with the drum surface 10 will depend upon (a) the spring index or the relationship between coil diameter and coil cross section, (b) the coefficient of friction between output drum and clutch spring; and (c) the number of coils 20d in interference fitting relation to output drum surface 11, no universally applicable or simple rule of procedure or construction can be given such as would indicate the operating limits or proportions which have to be observed in the successful practice of the present invention. A working formula for uniform section spring stock is given near the end of this specification.

We have fully tested the herewith illustrated spring clutch assembly in intermittently driving a rotary fan at around 1725 r.p.m. In the installation tested the clutch drums have approximately equal diameters of 1.313", the nomal inner spring diameter at coils 20a and 20b is approximately 1.290" and the normal inner spring diameter of coils 20d is approximately 1.264", thus the interference fit or elastic preloading of coils 20a and 20b on the drum surfaces is approximately .023" whereas the preloading of the coils 20d on output drum surface 11 is approximately .049". The spring 20 is of die drawn oil tempered steel wire, A.I.S.I.c-1065, and has an index of about 22.5. The torque required to cause overrun of the output drum member 5 in the coils 20d (in case member 5 is a zinc alloy die casting) is approximately 7.0 inch-ounces. That torque expands the coils 20a and 20b so that their inner diameters are approximately .022" larger than the associated drum diameters or, in other words, the total expansion of those coils from their normal or relaxed condition as shown in Fig. 3, is about .045". The coils 20a and 20b could withstand a much larger expansion within their elastic limits. Since, with the materials and dimensional relationships given above, more than sufficient separation of the coils 20a from the input drum surface 10 is produced, it is apparent that the difference in the elastic preloading of the coils 20d and 20a on their associated drum could have been somewhat less and/or the spring index could have been somewhat lower.

In conducting the above described tests it was found that friction in the fan drive assembly, not shown, assisted by slight and practically unavoidable frictional drag in the bearings 6, 7, 8 was adequate always to maintain the input-clutch-drum-associated coils 20a completely free from the drum surface 10 (during protracted clutch disengagement or idle periods) despite the inherent tendency of the coils 20a and 20b to reseat themselves on the drums.

In an expanding-to-grip type of spring clutch the coils corresponding to 20d in Fig. 3 would be radially offset outwardly from the other coils in the preferred practice of the present invention, and "uncoiling" on part of the input-drum-associated coils would be a contraction of the coils.

Formula

In any clutch spring made from constant cross section and otherwise uniform spring stock, overrunning torque ($T_0$) is the product of a value known in the art as overrunning torque ratio: ($K_0$), or $$1 - \frac{1}{e^{f \cdot N}}$$

(wherein "$e$" is the base of natural logarithms or 2.7183; "N" is the number of coils in interference fit, and "$f$" is the coefficient of friction) multiplied by so called "energizing torque": ($T_e$) or $$\frac{2EIA}{D^2}$$

(wherein "E" is the modulus of elasticity of the spring stock; "I" is the moment of inertia of the spring stock section; "A" is the diametral deflection or interference fit of the spring coils on the drum, and "D" is the mean diameter of the various coils). Thus $T_0 = K_0 T_e$.

Assuming in the present clutch mechanism that the elastic preloading of coils 20d is selected to produce sufficient overrunning torque to expand coils 20a clear of the input drum during clutch disengagement it is evident that the overrunning torque must then equal the spring moment of coils 20a (and 20b). The desired diametral clearance of the coils 20a in relation to the input drum 10 can be thereby equated with the other necessary design values or factors involved, as follows:

$$A_c = (A_d K_0) - A_n$$

(wherein "$A_c$" is such desired diametral clearance of coils 20a; "$A_d$" is the diametral deflection or amount of interference fitting of coils 20d on the output drum; "$K_0$" is the overrunning torque ratio as expressed above (involving coils 20d) and "$A_n$" is the diametral deflection or energizing interference fitting of coils 20a on the input drum 10). The value $A_n$ is subtracted, as indicated, because of the portion of the total overrunning torque which is required to obtain zero clearance or to overcome the initial preloading of coils 20a.

Regardless of the selected number of relatively heavily preloaded coils 20d and the amount of interference fit they have on drum 11 (which is, of course, within the elastic limit or yield point of the spring material) the stress in the expanded coils 20a (or 20b) cannot exceed the initial stress involved in the elastic preloading of coils 20d on drum 11. This is believed evident from the formula for "overrunning torque ratio" given above, since its value must be some fraction of 1. The formula for spring moment for a given diametral deflection is the same as for energizing torque.

We claim:

1. A friction coil clutch mechanism for coupling a continuously rotating drive to an intermittently operated load, said mechanism comprising an approximately cylindrical input clutch drum, an approximately cylindrical output clutch drum coaxial therewith, a full-floating type helical clutch spring having coils elastically preloaded radially against approximately cylindrical surface portions of respective drums, annular axial shoulders on respective drums facing respective end coil portions of the spring, a clutch release member and means supporting the release member for rotation relative to the drums about their common axis and in a predetermined axial position in the mechanism, said release member being connected to an input-drum-associated end coil of the spring, for rotation integrally with the spring, means operable to stop rotation of the release member hence rotation of the spring to disengage the clutch mechanism, said release member having a portion interposed between such input-drum associated free end coil of the spring and the axial shoulder of the input drum.

2. A friction coil clutch mechanism for coupling a continuously rotating drive to an intermittently operated driven load, said mechanism comprising an input clutch drum, an output clutch drum coaxial therewith, a full-floating type helical clutch spring having coils elastically preloaded radially against respective drums, a clutch release abutment connected to an input-drum-associated end coil portion of the spring and facing circumferentially of the spring in its driving direction, and a stop disposed to engage the abutment to stop rotation of said end coil portion of the spring and thereby disengage the clutch mechanism, the elastic preloading radial force of one or more of the output-drum-associated coils of the spring being greater than the elastic preloading radial force of any of the input-drum-associated coils of the spring, the input drum having an axially presented shoulder facing the input-drum associated end coil of the spring, and said clutch mechanism including a member connected to the spring for rotational movement integrally therewith, said member having a portion lying between said end coil and the shoulder.

3. A friction coil clutch mechanism for coupling a continuously rotating drive to an intermittently operated driven load, said mechanism comprising an approximately cylindrical input clutch drum, an approximately cylindrical output clutch drum coaxial therewith and of approximately the same diameter as the input drum, a full-floating type helical clutch spring all the coils of which have substantially the same cross sectional dimensions, the spring being elastically preloaded radially against respective drums, a clutch release abutment connected to an input-drum-associated end coil portion of the spring and facing circumferentially of the spring in its driving direction, and a stop disposed to engage the abutment to stop rotation of said end coil portion of the spring and thereby disengage the clutch mechanism, there being a difference in diameter between coils at opposite end portions of the spring when the spring is in a relaxed state such that, in operating position, the elastic preloading force of at least one coil of the spring on the output drum is on the order of twice the elastic preloading force of any coils of the spring on the input drum.

References Cited in the file of this patent

UNITED STATES PATENTS

| | | |
|---|---|---|
| 390,029 | Lombard | Sept. 25, 1888 |
| 1,641,418 | Elsey | Sept. 6, 1927 |
| 2,298,970 | Russell et al. | Oct. 13, 1942 |
| 2,685,949 | Dunlap | Aug. 10, 1954 |